April 7, 1959     A. L. CRANKE     2,880,668
APPARATUS FOR MOLDING MEAT PRODUCTS OR THE LIKE
Filed July 5, 1955     2 Sheets-Sheet 1

INVENTOR.
ALVIN L. CRANKE
BY
Francis W. Anderson
atty.

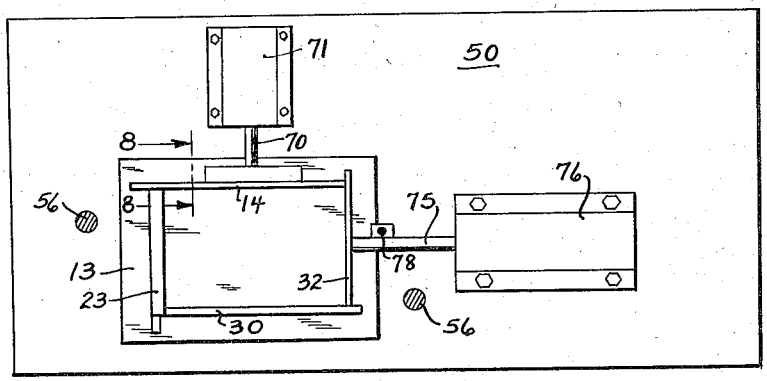
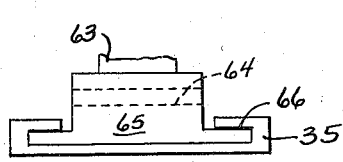
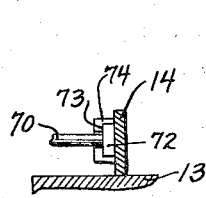
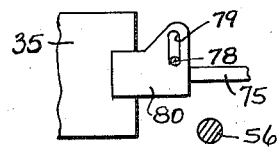
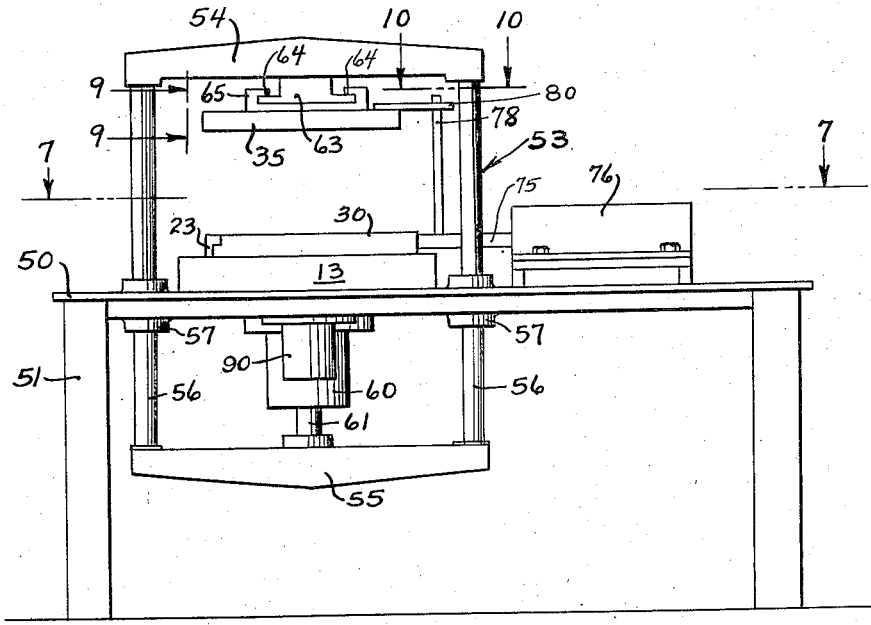
INVENTOR.
ALVIN L. CRANKE

United States Patent Office 2,880,668
Patented Apr. 7, 1959

2,880,668

APPARATUS FOR MOLDING MEAT PRODUCTS OR THE LIKE

Alvin L. Cranke, Menlo Park, Calif.

Application July 5, 1955, Serial No. 519,880

3 Claims. (Cl. 100—232)

This invention relates to apparatus for processing meat products or the like. More particularly it has to do with an improved machine for molding a meat product, such as bacon.

An object of this invention is to provide an apparatus for molding a meat product, or the like, into a predetermined shape that is particularly adapted for carrying out subsequent operations with a minimum amount of waste.

Figure 1 is a more or less schematic perspective of the improved meat molding machine of the present invention.

Figures 2 and 3 are fragmentary vertical sectional views taken on lines 2—2 and 3—3 of Fig. 1, respectively.

Figure 6 is a front elevation of a power actuated molding machine with which the molding apparatus of the present invention may be used.

Figure 7 is a horizontal sectional view taken on line 7—7 of Fig. 6.

Figure 8 is a fragmentary vertical sectional view taken on line 8—8 of Figure 7.

Figure 9 is a fragmentary vertical section taken on line 9—9 of Fig. 6.

Figure 10 is a fragmentary horizontal section taken on line 10—10 of Fig. 6.

Figure 4:
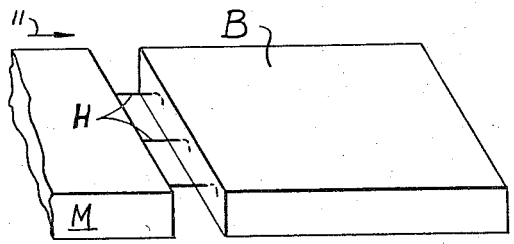
Figure 4 is a fragmentary schematic view of a slab of bacon which has been molded in accordance with conventional practice, a portion of a bacon slicing machine also being shown.

In Figure 4 a slab of bacon B is illustrated which has been molded in accordance with conventional practice. It will be noted that the slab B has a block-like configuration throughout its entire length. Hooks H of a standard slicing machine M are adapted to engage in the lower half of the end portion of the slab so that, as the machine M moves in the direction of arrow 11, the slab will be pushed past the blades (not shown) of the machine. Thus, the slab of bacon is sliced with the slicing cuts starting at the far end and moving toward the hooks. When the cutting blades near the hooks, the machine is shut off and the unsliced end portion is removed from the hooks. This end portion, which may be as much as two inches in length, can be sold only as an "end" at a reduced price. It will be apparent that there is a considerable amount of waste associated with a slab of bacon that is molded in accordance with conventional practice. When several thousand slabs are processed each day, the difference between the amount of money that the uncut end portions bring as "ends" and the amount they might bring as sliced bacon represents a considerable amount of money.

Figure 5:
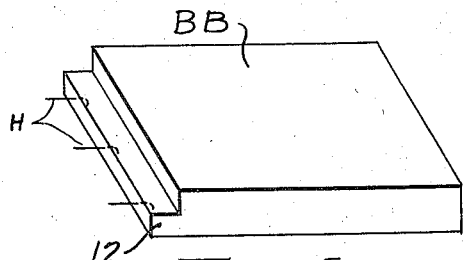
Figure 5 is a schematic view, similar to Fig. 4, but showing a slab of bacon molded in accordance with the teaching of the present invention.

In Figure 5 a slab of bacon BB is illustrated which has been molded in accordance with the teaching of the present invention. It will be noted that a ledge 12 is molded on the edge portion of the slab BB, the ledge being thick enough to receive the hooks H of a standard slicing machine M. The meat that would normally be above the ledge 12 is displaced rearwardly into the body of the slab so that this displaced meat is saved and may be sold at the higher price of sliced bacon.

Figure 1:
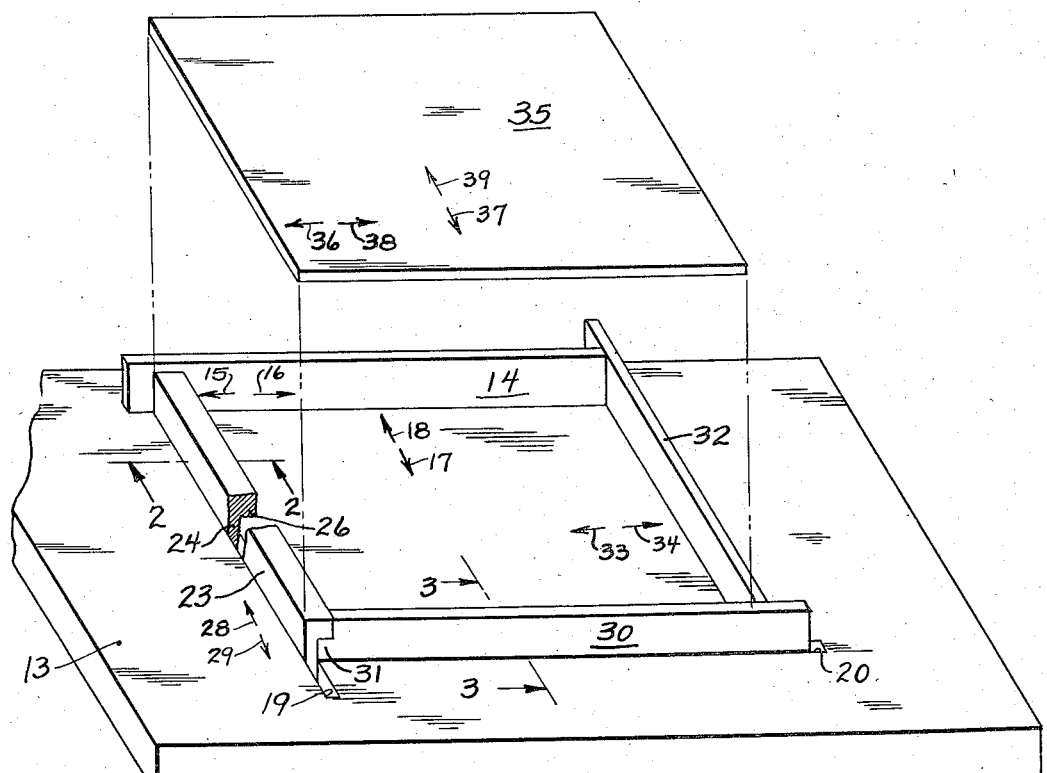
Figure 2:
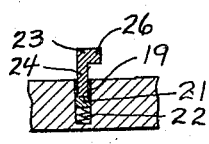
Figure 3:
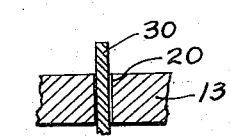

In Figure 1 the improved mold of the present invention is illustrated. The reference numeral 13 indicates a base plate which has two elongated slots 19 and 20 and on which a side plate 14 is mounted in upright position for movement along the surface of the base plate in the direction of arrows 15 and 16 and in the direction of arrows 17 and 18. The slot 19 (Fig. 2) receives an elongated flat bar 21 that is supported in the slot 19 on a plurality of coil springs 22 (one only being shown). A second side plate 23 has a vertical shank portion 24 supported on the bar 21 and has an upper, inwardly extending flange 26 that overlies the base plate. The side plate 23 is movable up and down in the slot 19 on its spring mounting and is movable longitudinally of the slot in the direction of arrows 28 and 29 (Fig. 1). A third side plate 30 is guided for vertical sliding movement in the slot 20 which, as seen in Fig. 3, extends entirely through the table 13. The side plate 30 has a recessed end 31 that underlies the flange 26 of the side plate 23. A fourth side plate 32 (Fig. 1) is supported in upright position on the top of the table 13 and is arranged to be reciprocated along the surface of the base plate or table 13 in the direction of arrows 33 and 34. The four side plates 14, 23, 30, and 32 cooperate to define a contractible mold which has a cover 35 arranged for movement upwardly and downwardly and in the direction of arrows 36, 37, 38 and 39.

The meat product to be molded is placed on the table inside the space enclosed by the four side plates. The cover 35 is moved downwardly to compress the meat and spread it laterally toward the side plates. In its downward movement the cover telescopes inside the side plates 14 and 32 but it contacts the top surface of the side plates 23 and 30 and moves them downwardly until the meat has a predetermined thickness, such as 2 inches. The side plate 14 is then moved inwardly toward the meat to compress the slab to a desired width, as for example 10 inches. During its inward movement, the side plate 14 engages the side edge of the cover 35 and the end surface of the side plate 23 and shifts the cover 35 in the direction of arrow 37 and the side plate 23 in the direction of arrow 29. The side plate 32 is then moved inwardly to compress the meat to the desired length, such as 20 inches. In its inward movement, the side plate 32 engages both the cover 35 and the side plate 14 and moves the cover in the direction of arrow 36 and moves the side plate 14 in the direction of arrow 15.

When the bacon is compressed between the four side plates and the cover 35, meat is forced under the flange 26 of the side plate 23 to form the ledge 12 on the molded slab. It will be evident that the loss of substantially one half of the usual "end" is avoided by the molding process of the present invention.

In Figures 6 through 10 a machine is illustrated that may be used for supporting, guiding and actuating the side plates and the cover 35 of the mold of the present invention. The machine has a table top 50 supported on legs 51. The base plate 13 of the mold may be secured to the table top 50 in any suitable manner, as by capscrews (not shown).

The cover 35 is reciprocated in a vertical direction by a movable frame 53 which comprises a top cross bar 54 and a bottom cross bar 55 connected by two spaced slide rods 56 that are journalled in sleeve bearings 57 extending through the table top 50. A double acting hydraulic cylinder 60 is secured to the underside of the table top 50, in any suitable manner, and has a piston rod 61 connected to the bottom cross bar 55. The mold cover 35 is suspended from the top cross bar 54 by means of a hanger 63 which is slidable in ways 64 formed in a member 65. The member 65 is slidable in ways 66 (Fig. 9) formed in the cover 35. The ways 64 permit movement of the cover in the direction of arrows 37 and 39, and the ways 66 to permit movement of the cover 35 in the direction of arrows 36 and 38 (Fig. 1).

The side plate 14 is reciprocated in the direction of arrows 17 and 18 by means of a piston rod 70 that projects from a double acting cylinder 71 (Fig. 7) mounted on the table top 50. The rod 70 has an end portion 72 (Fig. 8) that slides in ways 73 formed on a plate 74 secured to the plate 14. The ways 73 permit movement of the side plate 14 in the direction of arrows 15 and 16.

The side plate 32 is mounted on the end of a piston rod 75 of a double acting hydraulic cylinder 76 mounted on the table top 50. A rod 78 is secured to and extends upwardly from the piston rod 75 into a groove 79 (Fig. 10) formed in a plate 80 that is secured to the cover 35. This slotted connection permits the side plate 32 to move the cover in the direction of arrows 36 and 38, while permitting the cover to move in the direction of arrows 37 and 39.

The side plate 30 extends downwardly through the slot 20 in the base plate 13 and through a slot (not shown) in the table top 50. A hydraulic cylinder 90 (Fig. 6) is secured to the underside of the table top 50 directly below the slot in the table and the piston rod of the cylinder 90 is connected to and provides a resilient support for the side plate 30. It will be understood that conventional fittings and conduits are used for the various hydraulic circuits of this machine.

In operation, the meat to be molded is placed on the base plate 13 between the four side plates 14, 23, 30 and 32. Power is applied to the top side of the double acting cylinder 60 causing the frame 53 to lower the cover 35 into engagement with the meat in the mold and into contact with the top surfaces of the side plates 23 and 30 which move downwardly to permit the meat to be compressed to a desired thickness. Power is then applied to one end of the hydraulic cylinder 71 to force the side plate 14 inwardly in the direction of arrows 17 to compress the meat and shift the side plate 23 in the direction of arrow 29. When the meat is compressed to the desired width, the power to the cylinder 71 is shut off and fluid under pressure is directed to one end of the cylinder 76 to move the side plate 32 inwardly of the mold to compress the meat to a desired length.

It will be apparent that other means may be used to support, guide and actuate the various members of the mold of the present invention. Accordingly, all mechanical equivalents of the structure shown and claimed should be considered as being within the scope of the present invention.

From the foregoing description, it will be seen that the present invention provides a novel, efficient apparatus for molding a meat product or the like. The use of a ledge on one inner wall of the mold to form a recess in the product at a predetermined, desirable location assures the final processing of the product with a minimum amount of waste.

Having thus described my invention, what I claim as new and desire to protect by Letters Patent is:

1. In a mold for meat or the like having a baseplate and four upstanding side walls cooperating with the baseplate to define a mold enclosure, the improvement which comprises a flange disposed along the upper edge of one of said side walls projecting inwardly into said mold enclosure, means defining a recess in a second of said side walls that is adjacent to and at right angles to said one side wall, said recess being of a configuration to snugly receive said flange and permit movement of said one side wall in a direction at right angles to said second side wall, and means for moving said one side wall relative to said second side wall.

2. A mold for meat products comprising a baseplate; a plurality of upstanding side plates cooperating with said baseplate to form a mold enclosure, and including a first side plate having a flange along one edge projecting into said mold enclosure and a second side plate disposed at right angles to said first plate and having a recess adapted to receive the flange on said first side plate; and means for moving said first side plate relative to said second side plate to change the size of said mold enclosure, said flange being arranged to slide along said recess in snug engagement with the walls thereof during said enclosure-changing movement.

3. A mold for meat products or the like comprising a baseplate; means defining a pair of slots in said baseplate at right angles to each other; a plurality of upstanding side walls cooperating with said baseplate to form a mold enclosure and including a first side plate mounted for adjusting vertical movement in one of said slots and for longitudinal movement along said one slot, a flange extending along the upper edge of said first side plate and projecting into said mold enclosure, a second side plate disposed for vertical adjusting movement in the other of said slots, means defining a recess in the end of said second side plate adjacent said first side plate, said recess being arranged to slidably receive the flange of said first side plate; and means for moving said first side plate longitudinally in said one slot to change the size of said mold enclosure, said flange being arranged to slide along said recess in snug engagement with the walls thereof during said enclosure-changing movement; and a cover plate movable downwardly into engagement with said first and second side plates to move said side plates downwardly a predetermined distance and press meat under said flange while maintaining said flange in said recess.

References Cited in the file of this patent

UNITED STATES PATENTS

| | | |
|---|---|---|
| 892,138 | Crew | June 30, 1908 |
| 1,121,263 | MacKinnon | Dec. 15, 1914 |
| 1,186,348 | Strayer | June 6, 1916 |
| 2,043,366 | Bech | June 9, 1936 |
| 2,072,694 | Walter | Mar. 2, 1937 |
| 2,475,408 | Smelzer | July 5, 1949 |
| 2,478,520 | Baur | Aug. 9, 1949 |

FOREIGN PATENTS

| | | |
|---|---|---|
| 573,098 | France | Mar. 4, 1924 |